(12) United States Patent
Toth et al.

(10) Patent No.: US 11,018,571 B2
(45) Date of Patent: May 25, 2021

(54) REGULATION OF AN ELECTRONIC VOLTAGE ADAPTER MODULE

(71) Applicant: BELENOS CLEAN POWER HOLDING AG, Bienne (CH)

(72) Inventors: Antoine Toth, Delemont (CH); Yvan Leuppi, Rovray (CH)

(73) Assignee: BELENOS CLEAN POWER HOLDING AG, Bienne (CH)

(*) Notice: Subject to any disclaimer, the term of this patent is extended or adjusted under 35 U.S.C. 154(b) by 0 days.

(21) Appl. No.: 14/432,635

(22) PCT Filed: Oct. 2, 2013

(86) PCT No.: PCT/EP2013/070566
§ 371 (c)(1),
(2) Date: Mar. 31, 2015

(87) PCT Pub. No.: WO2014/053557
PCT Pub. Date: Apr. 10, 2014

(65) Prior Publication Data
US 2015/0244250 A1    Aug. 27, 2015

(30) Foreign Application Priority Data
Oct. 3, 2012   (EP) .................... 12187122

(51) Int. Cl.
*H02M 1/14*    (2006.01)
*H02J 3/38*    (2006.01)
(Continued)

(52) U.S. Cl.
CPC ............... *H02M 1/14* (2013.01); *H02J 3/385* (2013.01); *H02M 7/44* (2013.01); *H02M 7/4807* (2013.01);
(Continued)

(58) Field of Classification Search
CPC ........ H02M 1/14; H02M 1/143; H02M 1/146; H02M 1/15; H02M 7/44; H02M 7/4807;
(Continued)

(56) References Cited

U.S. PATENT DOCUMENTS 5,682,305 A * 10/1997 Kurokami ................. G05F 1/67
                                                        323/299
5,903,452 A *  5/1999 Yang ................. H02M 3/33507
                                                        363/131
(Continued)

OTHER PUBLICATIONS

International Search Report dated Mar. 25, 2014 in PCT/EP13/070566 filed Oct. 2, 2013.
(Continued)

*Primary Examiner* — Thienvu V Tran
*Assistant Examiner* — Carlos O Rivera-Perez
(74) *Attorney, Agent, or Firm* — Oblon, McClelland, Maier & Neustadt, L.L.P.

(57) ABSTRACT

An electric module for adapting a first signal of a first system to a second signal of a second system, including: a power supply source supplying a first signal; a converter module configured to convert the first signal into an intermediate signal; a microcontroller controlling and regulating the converter module; and an inverter module configured to output a signal compatible with a second signal of a second system.

22 Claims, 7 Drawing Sheets

(51) Int. Cl.
*H02M 7/48* (2007.01)
*H02M 7/44* (2006.01)
*H02M 1/00* (2006.01)

(52) U.S. Cl.
CPC .............. *H02M 2001/0009* (2013.01); *H02M 2001/0025* (2013.01); *Y02E 10/56* (2013.01)

(58) Field of Classification Search
CPC ............ H02M 7/00; H02M 7/02; H02M 7/42; H02M 7/48; H02M 7/4826; H02M 7/493; H02M 7/53; H02M 7/537; H02M 7/5387; H02M 7/53871; H02M 7/53873; H02M 7/5388; H02M 7/539; H02M 7/5395; H02M 2001/0009; H02M 2001/0067; H02M 2001/0007; H02M 2001/0025; H02M 5/40; H02M 5/42; H02M 2007/4803; H02M 2007/4815; H02M 2007/4822; H02M 1/12; H02M 1/42; H02M 1/44; H02M 1/46; H02M 2001/0022; H02M 1/4225; H02J 3/382; H02J 3/383; H02J 3/385; H02J 3/386; H02J 3/36; H02J 3/38; H02J 3/381; H02J 2300/26; Y02E 10/58; Y02E 10/56
USPC ......... 363/15–26, 34, 35, 37, 38, 40–48, 50, 363/56.12, 65, 74, 95–99, 125–134; 323/205–211, 222–226, 271–276, 323/282–288, 299–303, 351, 906; 307/31–39, 82; 361/18
See application file for complete search history.

(56) References Cited

U.S. PATENT DOCUMENTS

| | | | | |
|---|---|---|---|---|
| 6,339,262 | B1* | 1/2002 | Igarashi | H02M 1/34 307/31 |
| 6,400,582 | B1* | 6/2002 | Hemena | H02M 3/285 363/131 |
| 7,681,090 | B2* | 3/2010 | Kimball | H02M 3/156 323/222 |
| 2009/0080226 | A1* | 3/2009 | Fornage | G05F 1/67 363/74 |
| 2009/0179500 | A1 | 7/2009 | Ragonese et al. | |
| 2011/0264288 | A1* | 10/2011 | Khajehoddin | G05F 1/67 700/287 |
| 2012/0020122 | A1* | 1/2012 | Fornage | H02M 3/33515 363/21.12 |
| 2012/0043818 | A1* | 2/2012 | Stratakos | H02J 3/383 307/77 |
| 2012/0081934 | A1* | 4/2012 | Garrity | H02M 7/46 363/37 |
| 2012/0257429 | A1* | 10/2012 | Dong | H02M 3/1582 363/127 |
| 2013/0155735 | A1* | 6/2013 | Ilic | H02M 7/72 363/71 |

OTHER PUBLICATIONS

Hu, Haibing et al., "Power Decoupling Techniques for Micro-Inverters in PV Systems—a Review", Energy Conversion Congress and Exposition (ECCE), IEEE , XP031787487, pp. 3235-3240, 2010.

Lai, Ching-Ming et al., "Development of an Instantaneous Real Power Tracking Control Scheme for a Single-Phase Grid-Tied Photovoltaic Inverter with Minimum DC-Link Capacitance", Industrial Electronics (ISIE), XP032199973, pp. 1774-1779, 2012.

Stalter, O. et al., "Advanced Solar Power Electronics", Power Semiconductor Devices & ICs (ISPSD), 22nd International Symposium on IEEE, XP031729206, ( 8 pages), 2010.

Boehringer, A. F. et al., "Self-Adapting dc Converter for Solar Spacecraft Power Supply Selbstanpassender Gleichstromwandler fur die Energieversorgung eines Sonnensatelliten", IEEE Transactions on Aerospace and Electronic Systems, vol. AES-4, No. 1, XP055053272, pp. 102-111, 1968.

Li, X. et al., "Maximum Power Point Tracking for Photovoltaic Systems Using Adaptive Extremum Seeking Control", Decision and Control and European Control Conference (CDC-ECC), IEEE, XP032123281, pp. 1503-1508, 2011.

J H R Enslin, "Maximum Power Point Tracking: A Cost Saving Necessity in Solar Energy Systems", Institute of Electrical and Electronics Engineers, Signal Processing and System Control, Factory Automation, vol. Conf. 16, IEEE, XP010038313, pp. 1073-1077, 1990.

Kjaer, S. B. et al., "A Review of Single-Phase Grid-Connected Inverters for Photovoltaic Modules", IEEE Transactions on Industry Applications, vol. 41, No. 5, XP011139229, pp. 1292-1306, 2005.

* cited by examiner

REGULATION OF AN ELECTRONIC VOLTAGE ADAPTER MODULE

CROSS-REFERENCE TO RELATED APPLICATIONS

This is a National phase Application in the United States of International patent Application PCT/EP2013/070566 filed Oct. 2, 2015 which claims priority on European patent application 12187122.2 filed Oct. 3, 2012. The entire disclosure of the above patent applications are hereby incorporated by reference.

The invention concerns an electric module for adapting a first signal of a first system to a second signal of a second system including:
- an input arranged so that a power supply source can be connected thereto, said power supply source delivering a first signal, said first signal being a continuous signal with ripples,
- a converter module arranged to convert the supply voltage into an intermediate signal formed of a continuous component and a rectified sinusoidal component;
- an inverter module arranged to output a signal compatible with a second signal of a second system.

BACKGROUND OF THE INVENTION

There are known electrical systems whose purpose is to render a signal compatible with an electrical power grid. One example of these electrical systems includes an electrical power supply source such as a solar panel delivering a continuous signal, the output of said power supply is connected to a converter module delivering a signal including a continuous component and a sinusoidal component. This signal is sent to an inverter module which will convert the signal into a power grid compatible signal, in this case a sinusoidal signal.

In current systems, a decoupling device is installed between the electrical power supply and the converter module. This decoupling means may be a high value capacitor. This decoupling means prevents interfering signals from the converter module or from the inverter module from propagating in the power supply. Indeed, the impedance module of a capacitance capacitor is of shape $$\frac{1}{C \times \omega}$$

(where w=270. Thus, the higher the frequency, the lower the impedance (inverse function), which makes it possible to limit the amplitude of interference, especially if the frequency of interference is high. An electrical system using a solar panel to supply electric energy operates at a low frequency given that the output signal is 50 Hz. Consequently, a high value capacitor must be used.

However, these high value capacitors have the drawback of being large and expensive. Indeed, the price and the size of the capacitors vary with the value and technology used. For decoupling capacitors, a value of around 50000 µF is a common value; this value also depends on the system in which it is found. The value entails a specific capacitor technology and capacitor size, said size being connected to the value of said capacitor. For decoupling capacitors, electrolytic capacitors will be used.

SUMMARY OF THE INVENTION

It is an object of the invention to overcome the drawbacks of the prior art by proposing to provide an electronic system for adapting a first signal of a first system to a second signal of a second system which has the most competitive performance/cost ratio possible, i.e. which performs well while limiting manufacturing costs.

The invention therefore concerns an electrical module for adapting a first signal of a first system to a second signal of a second system including:
- a power supply source supplying a first signal;
- a converter module arranged to convert the first signal into an intermediate signal;
- a microcontroller for controlling and regulating the converter module;
- an inverter module arranged to output a signal compatible with a second signal of a second system, characterized in that the module includes at least one decoupling capacitor having a value permitting the first signal to include a continuous component and a sinusoidal component and in that the microcontroller is arranged so that regulation of the converter module can determine the desired regulation value for a second ripple of the first signal in relation to measurements made during a first ripple of the first signal.

In a first advantageous embodiment, said inverter module includes an H bridge.

In a second advantageous embodiment, it further includes a microcontroller for controlling said inverter module.

In a third advantageous embodiment, the converter module includes at least one regulating unit comprising a transformer which is connected in series with switching means, said switching means being controlled by said microcontroller.

In a first advantageous embodiment, said converter module includes at least two regulating units connected in parallel, the regulating units being controlled by pulse width modulation.

The invention also concerns a method of operating an electrical module for adapting a first signal of a first system to a second signal of a second system, said module comprising:
- a power supply source supplying a first signal,
- a converter module arranged to convert the first signal into an intermediate signal;
- a microcontroller for controlling and regulating the converter module;
- an inverter module arranged to output a signal compatible with a second signal of a second system, characterized in that the module includes at least one decoupling capacitor permitting the first signal to include a continuous component and a sinusoidal component and in that the method includes a regulating step intended to regulate the power delivered by the power supply through the first signal, said step consisting, during the first ripple of the first signal, in performing power measurements so as to determine the desired regulation value for a second ripple of the first signal.

In a first advantageous embodiment, the regulating step consists in:
a) making power measurements at regular intervals during a ripple of the first signal;
b) averaging the power and saving this value in a first memory area
c) comparing this mean to the mean of the power measurements made in a preceding ripple and saved in a second memory area:
   if the value of the first memory area is higher than that of the second memory area, sending a command to increase the desired voltage or current value of the first signal in order to increase power;

if the value of the first memory area is lower than that of the second memory area, sending a command to decrease the desired voltage or current value of the first signal in order to decrease power;

otherwise varying the desired voltage or current value of the first signal and starting again at step a)

d) starting at step a) again

In a second advantageous embodiment, the regulating step consists in:

A) making instantaneous power measurements at regular intervals during a ripple of the first signal;

B) analysing these instantaneous power measurements, if the instantaneous power goes through a maximum, saving in a first memory area and performing an improvement step.

otherwise increasing the power delivered by the power supply through the first signal by increasing the desired voltage or current value.

C) starting at step A) again.

In a third advantageous embodiment, the improvement step consists in modifying the desired voltage or current value so that maximum power is achieved in the middle of the ripple or at the moment which provides the mean maximum power.

In another advantageous embodiment, the regulating step consists in:

A') making instantaneous power and voltage measurements at regular intervals during a ripple of the first signal;

B') determining the maximum instantaneous power of said ripple

C') determining, from this maximum instantaneous power, the voltage of the first signal providing said maximum instantaneous power;

D') adjusting regulation so that the voltage of the first signal providing said maximum instantaneous power becomes the desired value for the next ripple.

BRIEF DESCRIPTION OF THE DRAWINGS

The objects, advantages and features of the electronic module and the method according to the present invention will appear more clearly in the following detailed description of at least one embodiment of the invention, given solely by way of non-limiting example and illustrated by the annexed drawings, in which:

FIGS. 1 to 6 show schematic views of the electronic module according to the invention;

FIGS. 2 to 5 each show schematic views of a variant of the invention;

DETAILED DESCRIPTION OF THE INVENTION

Figure 1:
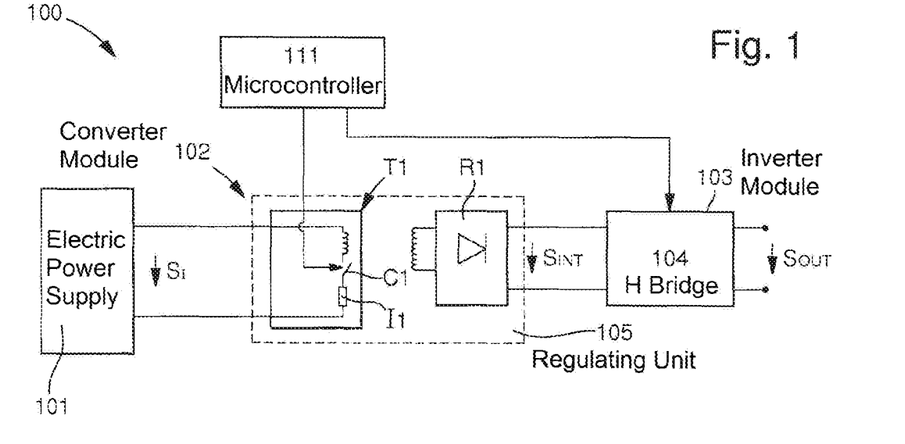

FIG. 1 shows an electronic system according to the invention. The electronic system is an electrical module 100 for adapting a first signal $S_I$ of a first system to a second signal $S_{out}$ of a second system, the first system may be an electric power supply or energy source or power supply source 101 supplying a power signal called $S_I$. For example, this electric power supply may be one or more solar panels or one or more wind turbines or one or more batteries or other elements. The second system is, for example, the domestic electrical power grid, i.e. a sinusoidal voltage.

Figure 2:
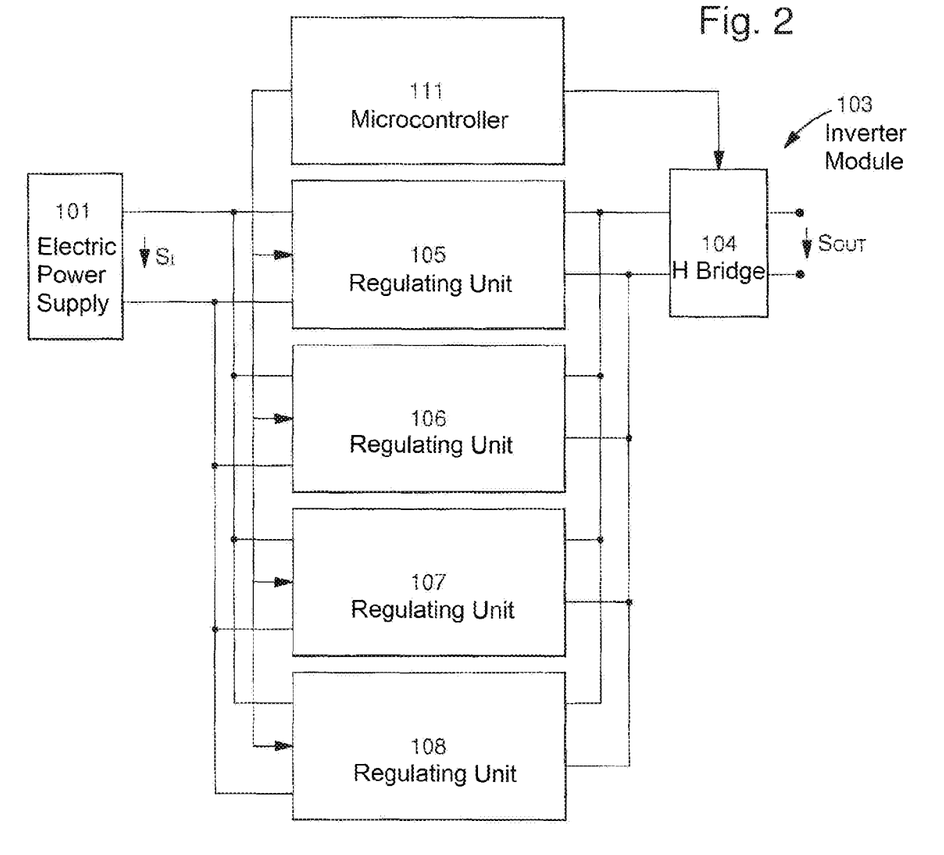

Power signal $S_I$ at the power supply output enters a converter module 102. The converter module 102 includes at least one regulating unit 105. In a variant seen in FIG. 2, it may be provided that converter module 102 includes several regulating units 106, 107 and 108 mounted in parallel.

The regulating unit includes a transformer T1 in series with switching means C1. Regulating unit 105 further includes a current measuring means I1 series connected to switching means C1. Transformer T1, switching means C1 and current measuring means I1 are connected in parallel with electric power supply 101. Regulating unit 105 also includes a rectifier R1 connected to the output of transformer T1 to deliver an intermediate signal $S_{int}$. It is thus clear that regulating unit 105 includes its own rectifier. Converter module 102 further includes a microcontroller 111. This microcontroller 111 is used to control regulating unit 105 and to regulate said unit.

Figure 5:
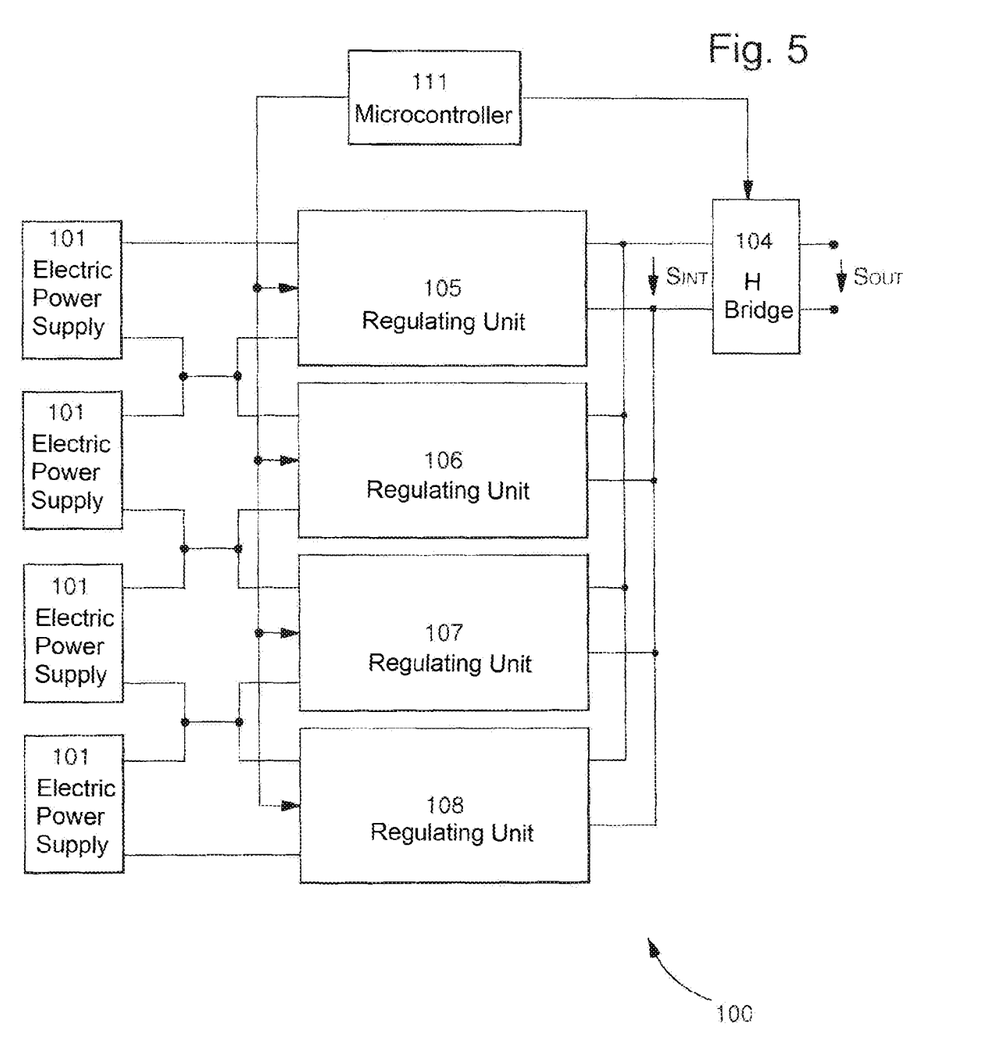

In the case of FIG. 5, where converter module 102 includes several regulating units 105, 106, 107 and 108 in parallel or in series or in a combination of parallel and series connections, microcontroller 111 controls each regulating unit 105, 106, 107 and 108 using pulse-width modulation. In that case, microcontroller 111 controls all of the regulating units. If there are several electric power supplies 101 in parallel or in series, control of the regulating units may be separate for each unit or set of regulating units.

Intermediate signal $S_{int}$ is sent to an inverter module 103. This intermediate signal $S_{int}$ takes the form of a half sine or rectified sine signal, i.e. the sinusoidal portions are all positive.

Inverter module 103 includes an H bridge circuit 104. This type of circuit takes the form of a plurality of switches arranged in an H shape. It is thus clear that said H bridge includes two parallel branches each formed of two series-connected switches. H bridge 104 powers a load which happens to be the central branch connecting the two parallel branches; this central branch is connected to each branch at the point of connection between the two switches.

The bridge can be controlled to vary the polarity of the load voltage cyclically to turn it into an inverter; microcontroller 111 is arranged to send control signals to the switches of the H bridge and obtain an inverter function. The object is thus to output signal $S_{out}$ which is a signal compatible with the power grid, i.e. a sinusoidal signal of 50 Hz frequency.

Thus, in the ideal version shown in FIG. 1, the power supply and the converter module are connected directly to each other, there is no device arranged to prevent propagation of signals produced by the inverter module towards power supply source 101.

Figure 6:
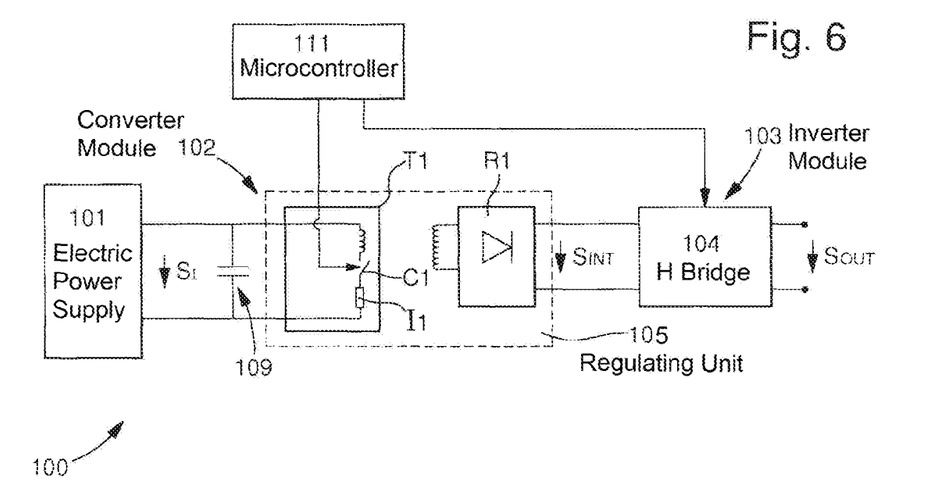

Advantageously according to the invention, the performance/cost ratio is optimised. To achieve this, the electronic system 100 according to the invention includes at least one decoupling capacitor 109 as seen in FIG. 6. This decoupling capacitor 109 has a value permitting the first signal or power signal $S_1$ to include a continuous component and a sinusoidal component. Decoupling capacitor 109 will have the lowest possible value but sufficient for power signal $S_1$ to include a continuous component and a sinusoidal component.

The presence of decoupling capacitor 109 makes it possible to have a ripple signal $S_1$ and to remove the high frequency harmonics to earth to increase the electromagnetic immunity of the circuit in which it is arranged, while still limiting costs. The mere presence of this capacitor 109 has a harmonic filtering action, while its low capacitance value allows a simple and inexpensive technology to be utilised.

For example, for an electronic system according to the invention having 100 W power, with a voltage of 12V, a 10000 µF decoupling capacitor will be used.

It will be observed that power signal $S_1$ has a frequency double that of the second system. For example, if the second system is the power grid operating at 50 Hz, power signal $S_1$ will have a frequency of 100 Hz. Indeed, the signal of the second system $S_{out}$ is sinusoidal, which means that this signal $S_{out}$ has, for one period, a positive ripple and a negative ripple. Since intermediate signal $S_{int}$ has a rectified waveform, it only has positive ripples. Consequently, the frequency is multiplied.

This configuration of the electronic system can use a specific method to manage the operation of the microinverter. The method is then configured so that the regulation of and search for the maximum power point is synchronous with the output signal $S_{out}$ of electronic signal 100.

Figure 3:
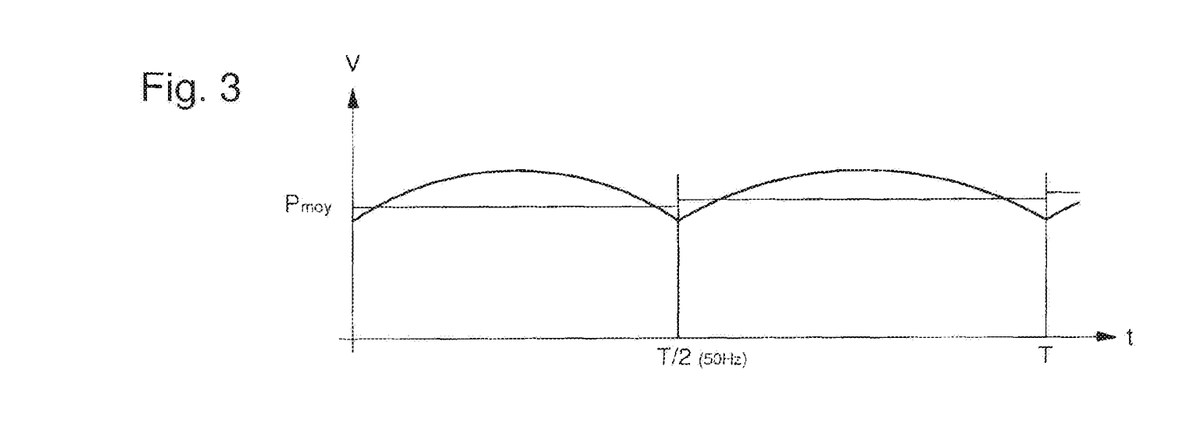
FIGS. 3 to 4 are schematic views of voltage diagrams of the electronic module of first and second embodiments of the invention.

According to a first embodiment seen in FIG. 3, the search for the maximum power point Pma is configured to have a frequency modelled on that of power signal $S_I$. To achieve this, converter module 102 and microcontroller 111 are arranged, over one half-wave, to make a series of voltage and current measurements of power signal $S_I$. These voltage and current signals thus permit calculation of a power and it is then possible to calculate mean power Pmoy. This mean power value Pmoy is saved in a first buffer memory.

After the very first ripple, a power variation is sent by microcontroller 111. This desired value or command for power variation starts the regulation. Preferably, a desired value requiring increased power is sent. This power increase may occur by varying the current or the output voltage of the power supply. In the case of the electronic system 100 described, the power variation occurs by current modification. To achieve this, microcontroller 111 acts on the pulse width modulation parameters. Indeed, pulse width modulation allows more or less current to flow in regulating unit 105.

To increase power, microcontroller 111 thus adjusts the cyclic ratio by increasing it. Since the cyclic ratio is higher, more current passes through regulating unit 105. The increase in cyclic ratio may be predefined or may be defined by the user.

Then, for the next half-wave, the same actions are performed, that is to say that the voltage and current measurements of power signal $S_I$ are made, and the mean power Pmoy is calculated and placed in a second buffer memory. Once this mean power Pmoy has been calculated, the measured value and that of the first half-wave are compared.

If the mean of the first half-wave is less than the mean of the second half-wave, microcontroller 111 understands that maximum power has not been achieved. Consequently, microcontroller 111 will send a command or desired value for increased power via the current delivered by power supply 101. The value of the first buffer memory will be deleted and the second buffer memory value will be transferred into the first buffer memory.

During the next half-wave, measurements will also be made of the voltage and current of power signal SI and therefore of the power, so as to calculate mean power value Pmoy. This mean value will be saved in the second buffer memory and a comparison step will take place.

If the mean of the first half-wave is higher than the mean of the second half-wave, microcontroller 111 understands that the current delivered by power signal $S_I$ is too high and therefore that the maximum power point has been exceeded. Microcontroller 111 will then send a desired value for the purpose of decreasing the output current of power supply 101. A new series of measurements is performed during the next half-wave resulting in the calculation of a mean. This mean power Pmoy will be compared to that of the preceding half-wave and so on. Of course, it is possible to envisage achieving the desired power variation value by means of voltage variation.

Figure 8:
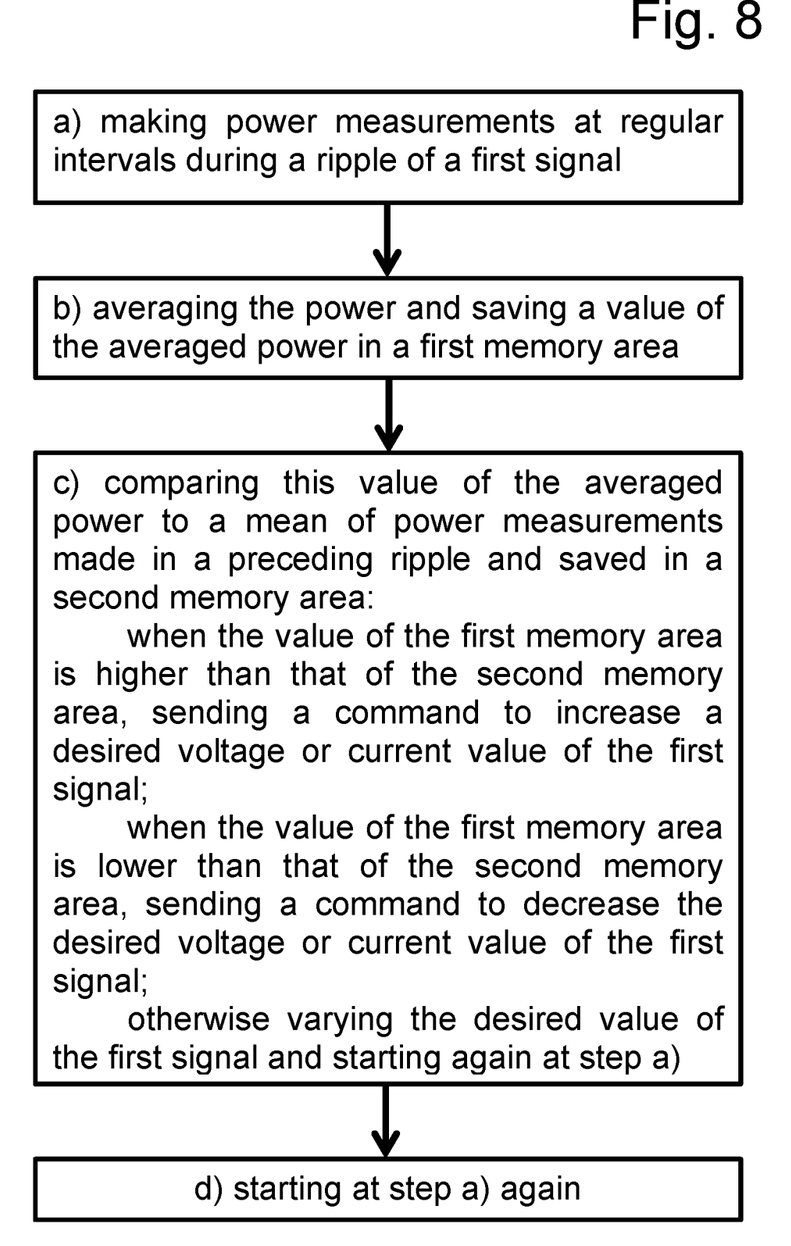
FIGS. 8 to 10 are illustrative flowcharts that each show steps included in a regulating step to regulate power delivered by a power supply through a first signal.

In short, as shown in FIG. 8, the regulating step consists in:
a) making power measurements at regular intervals during a ripple of the first signal;
b) averaging the power and saving this value in a first memory area;
c) comparing this mean to the mean of the power measurements made in a preceding ripple and saved in a second memory area:
   if the value of the first memory area is higher than that of the second memory area, sending a command to increase the desired value of the voltage or current of the first signal in order to increase power;
   if the value of the first memory area is lower than that of the second memory area, sending a command to decrease the desired value of the voltage or current of the first signal in order to decrease power;
   otherwise varying the desired value of the voltage or current of the first signal and starting again at step a);
d) starting at step a) again.

Figure 4:
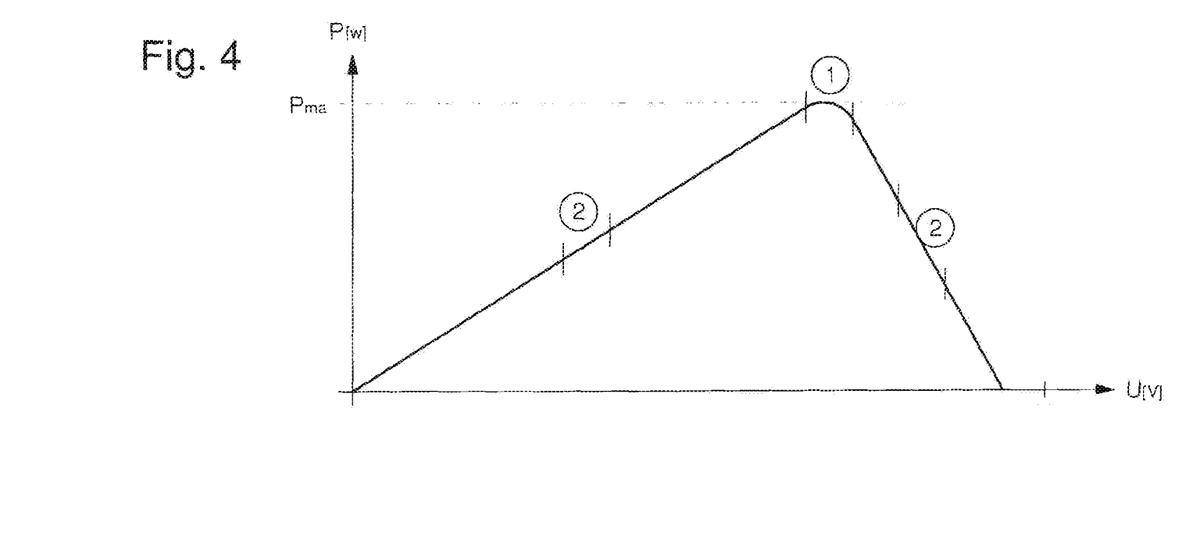

In a second embodiment seen in FIG. 4, the regulation of the converter module is configured such that the variation in the desired value is calculated over one ripple or period. Consequently, it changes according to the operation of the system.

Indeed, at the start of the system, namely in areas 2 of FIG. 4, the power is zero, whereas once the system is in steady state, the power delivered is theoretically constant. Nonetheless, regulation occurs in the same manner.

This is achieved by using the fact that the output signal of the power supply or power signal $S_I$ has a sinusoidal or ripple component. This variation in voltage or ripple involves a variation in instantaneous power, which means that with each ripple, the instantaneous power varies around a central point which is the mean power and that this instantaneous power can be measured.

During the starting phase, the desired power value requires an increase in the power delivered by the power supply. With each ripple, the instantaneous power is measured at regular intervals. If it is measured that the power only increases, the microcontroller concludes that the maximum power point is not reached and saves the highest measured power point. The desired value requiring an increase in power by modifying the voltage is thus maintained and applied from the highest previously measured power point.

During a ripple, if it is measured that the instantaneous power increases then decreases, i.e. area 1, this means that the maximum power point is reached and in that case, the microcontroller moves into a monitoring phase. In this phase, the instantaneous power of each ripple is measured. The measurements are then compared to those of the preceding ripple so that no power increase or decrease command is sent if the power variations are small.

It is possible to envisage a step intended to improve the power supply output signal. Indeed, the fact that the maximum power point has been reached does not mean that the power supply output signal $S_I$ is perfect. It is possible for the signal to be unbalanced. Indeed, control of the power supply output signal $S_I$ is achieved such that the maximum power point is reached twice. This maximum power point can be reached at the beginning and end of the ripple or in the middle of the ripple. The power point must then be maximised so that the mean power during the ripple is as high as possible. The improvement step thus consists in modifying the desired voltage or current value so that the maximum power Pma is reached at the moment that provides the mean maximum power.

Further, the step consisting in performing power measurements makes known the power distribution and thus where the maximum power points are. With this knowledge, it becomes easier to modify control of the power supply output signal $S_I$ to obtain a power supply output signal $S_I$ in which the maximum power points are ideally placed.

Figure 9:
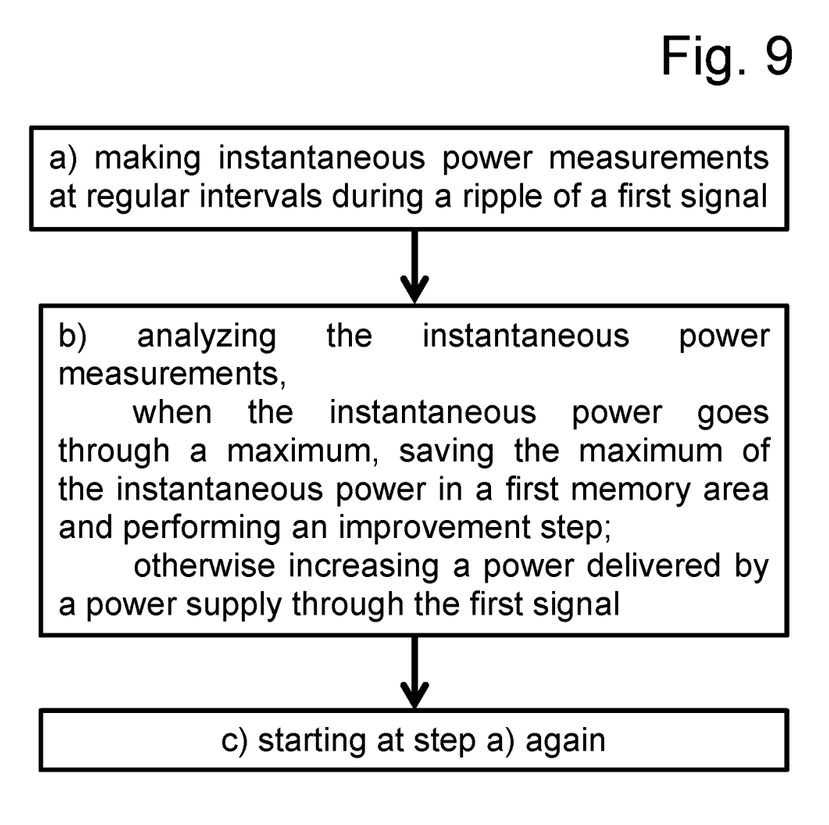

In short, as shown in FIG. 9 in this second embodiment, the regulating step consists in:
A) making instantaneous power measurements at regular intervals during a ripple of the first signal;
B) analysing these instantaneous power measurements,
 if the instantaneous power goes through a maximum, saving in a first memory area and performing an improvement step.
 otherwise increasing the power delivered by the power supply through the first signal by increasing the desired voltage or current value.
C) starting at step A) again.

Figure 7:
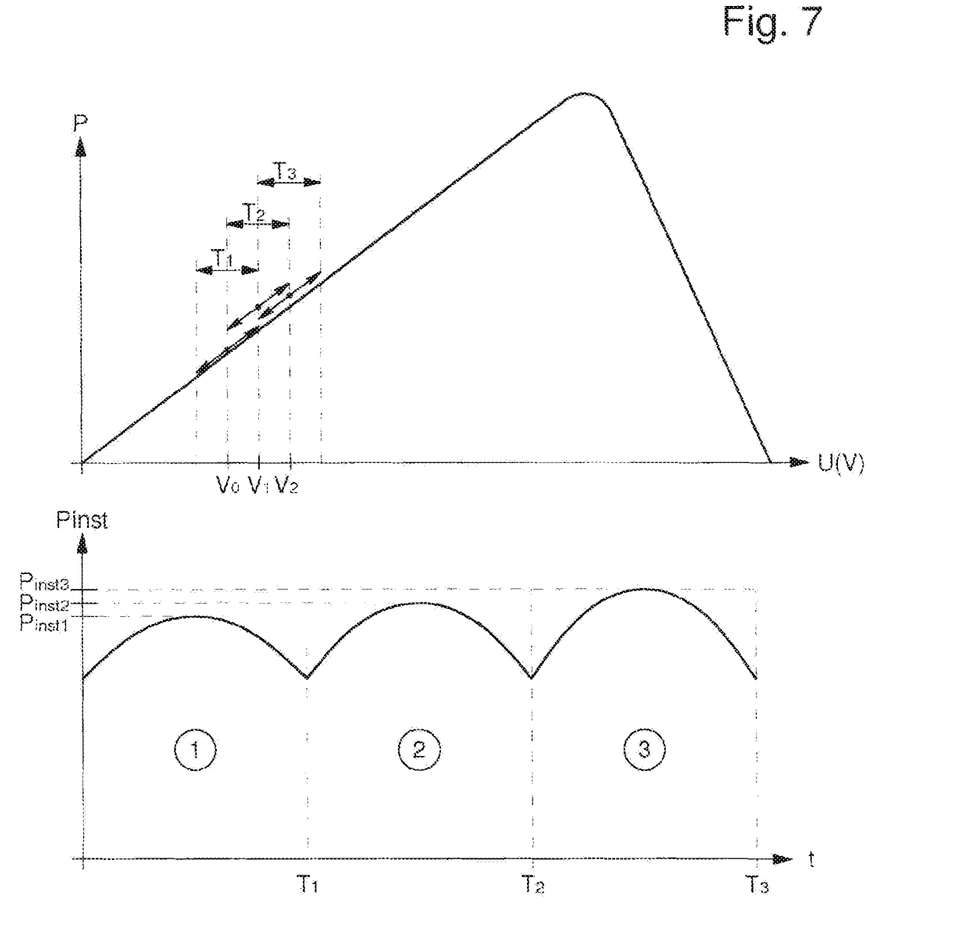
FIG. 7 shows diagrams of a variant of the second embodiment.

In a variant of this second embodiment seen in FIG. 7, microcontroller 111 is configured so that at each ripple or period, the instantaneous power Pinst and the voltage of first signal $S_I$ are measured at regular intervals. For example, for a power signal $S_I$ at 100 Hz and thus a period of 0.01 s, it is possible to have a microcontroller 111 which performs one hundred instantaneous power measurements per period, namely with an interval of 0.0001 s.

For a first period T1, the desired supply voltage value is V0 and microcontroller 111 measures instantaneous power Pinst and the supply voltage of the first signal $S_I$. Each measurement of instantaneous power Pinst and of the supply voltage of signal $S_I$ is saved. Microcontroller 111 detects the maximum instantaneous power Pinst1. This maximum instantaneous power Pinst1 is saved in a buffer area of a memory.

Microcontroller 111 is configured, from maximum power Pinst1, to identify the supply voltage V1 at which the instantaneous power Pinst1 detected during the ripple is highest. Once this supply voltage V1 has been found, microcontroller 111 uses it as the desired value for the next period. Indeed, since microcontroller 111 makes supply voltage measurements in parallel with power measurements, it can easily find the supply voltage associated with instantaneous power Pinst1.

In the next period T2, voltage V1 is used as the desired value of power signal $S_I$. Instantaneous power Pinst is measured in order to find instantaneous power Pinst2. This power Pinst2 is used by microcontroller 111 to determine the desired value V2 used for the subsequent period T3.

Figure 10:
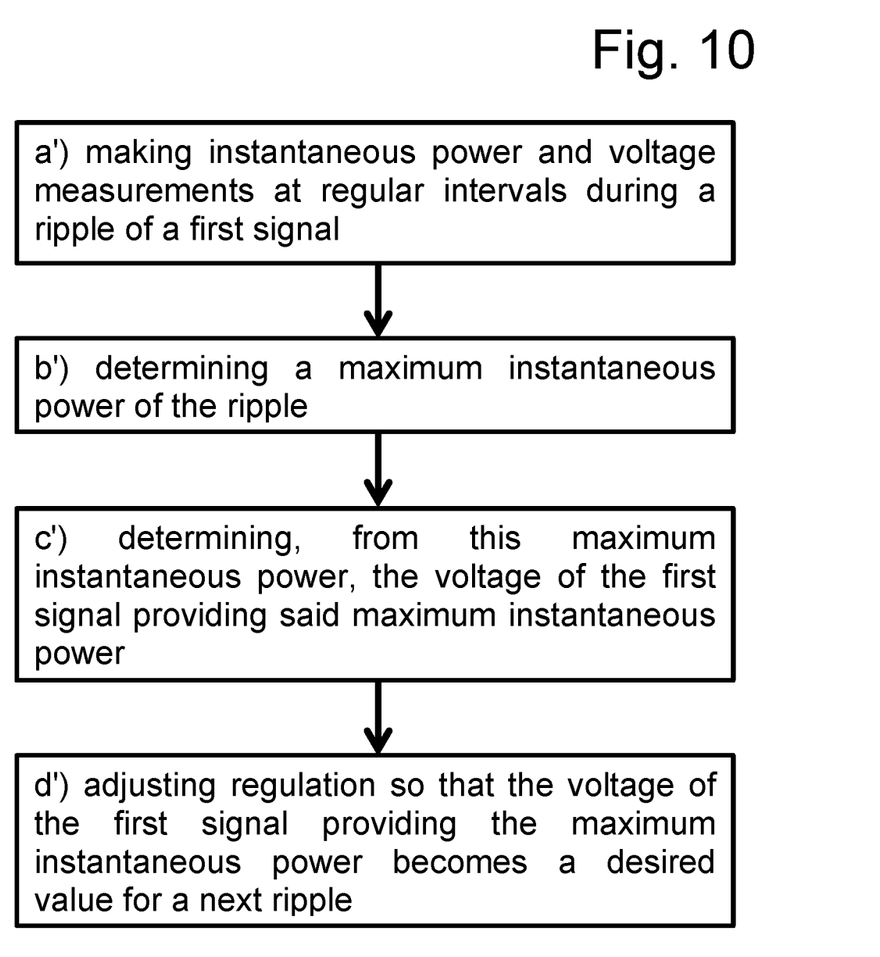

In short, as shown in FIG. 10, the regulating step consists in:
A') making instantaneous power and voltage measurements at regular intervals during a ripple of the first signal ($S_I$);
B') determining the maximum instantaneous power (Pinst) of said ripple
C') determining, from this maximum instantaneous power, the voltage of the first signal ($S_I$) providing said maximum instantaneous power;
D') adjusting regulation so that the voltage of the first signal providing said maximum instantaneous power becomes the desired value for the next ripple.

This use of instantaneous power to determine the desired value applied for the next period provides independent regulation, i.e. which does not require a predefined desired value.

It will be clear that various alterations and/or improvements and/or combinations evident to those skilled in the art may be made to the various embodiments of the invention set out above without departing from the scope of the invention defined by the annexed claims.

The invention claimed is:

1. An electrical module for adapting a first signal of a first system to a second signal of a second system, comprising: a power supply source supplying the first signal; a converter module configured to convert the first signal into an intermediate signal; a microcontroller controlling and regulating the converter module; an inverter module configured to output a signal compatible with the second signal of the second system; and at least one electrolytic decoupling capacitor having a lowest possible value that still permits the first signal to include a continuous component and a sinusoidal component; wherein the microcontroller is configured to regulate the converter module to determine a desired regulation value fora second ripple in a waveform of the first signal based on measurements made on a first ripple in the waveform of the first signal, the microcontroller being configured to send a power variation after the first ripple to adjust a mean power of the second ripple to be greater than a mean power of the first ripple, wherein the first and second ripples are formed by the at least one electrolytic decoupling capacitor acting upon the first signal, the first ripple is a first wave over at least half a period of the waveform, the second ripple is a second wave over at least half the period of the waveform, and the second wave is after the first wave in the waveform.

2. The electronic module according to claim 1, wherein the inverter module includes an H bridge.

3. The electronic module according to claim 2, further comprising the microcontroller controlling the inverter module.

4. The electronic module according to claim 3, wherein the converter module includes at least one regulating unit comprising a transformer connected in series with a switch, the switch being controlled by the microcontroller.

5. The electronic module according to claim 4, wherein the converter module includes at least two regulating units connected in parallel, the regulating units being controlled by pulse width modulation.

6. The electronic module according to claim 2, wherein the converter module includes at least one regulating unit comprising a transformer connected in series with a switch, the switch being controlled by the microcontroller.

7. The electronic module according to claim 6, wherein the converter module includes at least two regulating units connected in parallel, the regulating units being controlled by pulse width modulation.

8. The electronic module according to claim 1, further comprising the microcontroller controlling the inverter module.

9. The electronic module according to claim 8, wherein the converter module includes at least one regulating unit comprising a transformer connected in series with a switch, the switch being controlled by the microcontroller.

10. The electronic module according to claim 9, wherein the converter module includes at least two regulating units connected in parallel, the regulating units being controlled by pulse width modulation.

11. The electronic module according to claim 1, wherein the converter module includes at least one regulating unit comprising a transformer connected in series with a switch, the switch being controlled by the microcontroller.

12. The electronic module according to claim 11, wherein the converter module includes at least two regulating units connected in parallel, the regulating units being controlled by pulse width modulation.

13. The electronic module according to claim 1, wherein the inverter module is configured to receive the intermediate signal that includes a waveform of a half sine or rectified sine signal.

14. The electronic module according to claim 1, wherein the inverter module is configured to output a sinusoidal signal compatible with the second signal of the second system.

15. The electronic module according to claim 1, wherein a frequency of the first signal is greater than a frequency of the signal output from the inverter module.

16. The electronic module according to claim 1, wherein the at least one electrolytic decoupling capacitor has a lowest possible value sufficient for the first signal to include the continuous component and the sinusoidal component.

17. The electronic module according to claim 1, wherein the at least one electrolytic decoupling capacitor has a value of 10000 µF.

18. A method for operating an electrical module for adapting a first signal of a first system to a second signal of a second system, the electrical module including: a power supply source supplying the first signal: a converter module configured to convert the first signal into an intermediate signal; a microcontroller controlling and regulating the converter module; an inverter module configured to output a signal compatible with the second signal of the second system; at least one electrolytic decoupling capacitor a lowest possible value that still permits the first signal to include a continuous component and a sinusoidal component; and wherein the method comprises: regulating power delivered by the power supply source through the first signal, the regulating including, during a first ripple in a waveform of the first signal, performing power measurements on the first ripple in the waveform to determine a desired regulation value for a second ripple in the waveform of the first signal, and sending a power variation with the microcontroller after the first ripple to vary a mean power of the second ripple to be greater than a mean power of the first ripple, wherein the first and second ripples are formed by the at least one electrolytic decoupling capacitor acting upon the first signal, the first ripple is a first wave over at least half a period of the waveform, the second ripple is a second wave over at least half the period of the waveform, and the second wave is after the first wave in the waveform.

19. The operating method according to claim 18, wherein the regulating includes:
   a) making power measurements at regular intervals during a ripple in the waveform of the first signal;
   b) averaging the power and saving a value of the averaged power in a first memory area;
   c) comparing this value of the averaged power to a mean of the power measurements made in a preceding ripple in the waveform and saved in a second memory area:
      when the value of the first memory area is higher than that of the second memory area, sending a command to increase a desired voltage or current value of the first signal;
      when the value of the first memory area is lower than that of the second memory area, sending a command to decrease the desired voltage or current value of the first signal;
      otherwise varying the desired value of the first signal and starting again at step a); and
   d) starting at step a) again.

20. The operating method according to claim 18, wherein the regulating includes:
   a) making instantaneous power measurements at regular intervals during a ripple in the waveform of the first signal,
   b) analyzing the instantaneous power measurements,
      when the instantaneous power goes through a maximum, saving the maximum of the instantaneous power in a first memory area and performing an improvement step;
      otherwise increasing the power delivered by the power supply through the first signal; and
   c) starting at step a) again.

21. The operating method according to claim 20, wherein the improvement step includes modifying a desired voltage or current value so that maximum power is achieved at a moment that provides a mean maximum power.

22. The operating method according to claim 18, wherein the regulating includes:
   a') making instantaneous power and voltage measurements at regular intervals during a ripple in the waveform of the first signal;
   b') determining a maximum instantaneous power of the ripple in the waveform;
   c') determining, from this maximum instantaneous power, the voltage of the first signal providing said maximum instantaneous power; and
   d') adjusting regulation so that the voltage of the first signal providing the maximum instantaneous power becomes a desired value for a next ripple in the waveform.

* * * * *

UNITED STATES PATENT AND TRADEMARK OFFICE
CERTIFICATE OF CORRECTION

PATENT NO. : 11,018,571 B2  
APPLICATION NO. : 14/432635  
DATED : May 25, 2021  
INVENTOR(S) : Antoine Toth et al.

Page 1 of 1

It is certified that error appears in the above-identified patent and that said Letters Patent is hereby corrected as shown below:

In the Claims

In Column 8, Claim 1, Line 32, delete "fora" and insert -- for a --, therefor.

In Column 9, Claim 18, Line 43, insert -- having -- after "capacitor".

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*